Figures 1, 2:
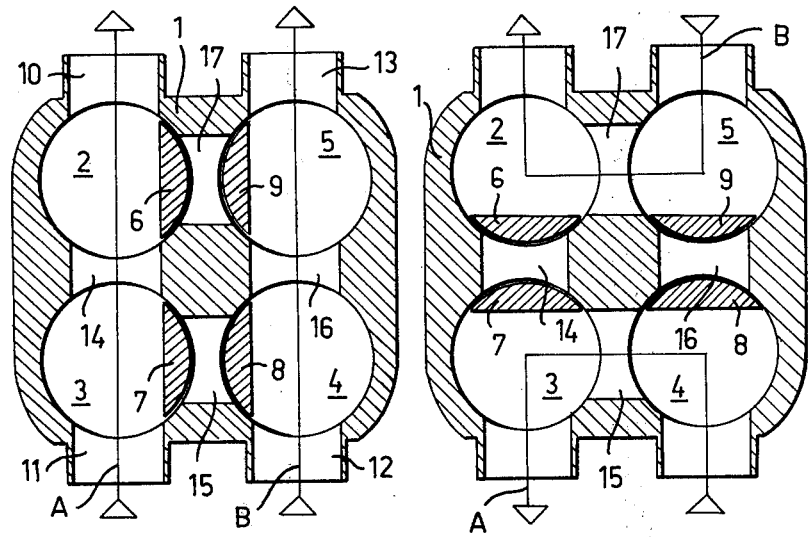

United States Patent [19]

Niskanen

[11] 4,013,094
[45] Mar. 22, 1977

[54] 4-WAY VALVE FOR SEPARATING OF TWO LIQUID SUPPLY LINES, ESPECIALLY IN DAIRIES AND SIMILAR PLANTS

[76] Inventor: Erkki Pietari Niskanen, Kissankellontie 13, 00700 Helsinki 70, Finland

[22] Filed: Sept. 24, 1975

[21] Appl. No.: 616,216

[30] Foreign Application Priority Data

Oct. 23, 1974 Finland .............................. 3104/74

[52] U.S. Cl. .............................. 137/597; 137/238; 137/614.11
[51] Int. Cl.² ........................................ F16K 11/16
[58] Field of Search .................... 91/270, 448, 456; 137/238, 239, 241, 596, 596.17, 596.18, 597, 614.11

[56] References Cited

UNITED STATES PATENTS

| | | | |
|---|---|---|---|
| 1,073,954 | 9/1913 | Burns | 91/456 |
| 2,607,323 | 8/1952 | Kromhout | 91/270 |
| 3,934,609 | 1/1976 | Haggqvist | 137/597 X |

Primary Examiner—Robert G. Nilson
Attorney, Agent, or Firm—Ladas, Parry, Von Gehr, Goldsmith & Deschamps

[57] ABSTRACT

A 4-way valve for selectively connecting two liquid supply lines separately to a container. The valve comprises a housing forming four chambers each provided with an inlet/outlet connection and each connected by means of connecting channels with two adjacent chambers. Each chamber is provided with a rotary slide displaceable between a first operating position in which the slide closes one of said connecting channels of the chamber and a second operating position in which the slide closes the other of said connecting channels of said chamber. The slides are operationally coupled to each other in such a way that in each operating position two connecting channels are closed at two ends and the other two connecting channels are open in order to obtain a double sealing of said closed connecting channels.

4 Claims, 5 Drawing Figures

4-WAY VALVE FOR SEPARATING OF TWO LIQUID SUPPLY LINES, ESPECIALLY IN DAIRIES AND SIMILAR PLANTS

This invention relates to a 4-way valve for selectively connecting the two liquid supply lines separately to a container for conducting a liquid into and out from said container, especially in dairies and similar plants, comprising a housing provided with two inlet connections and two outlet connections and four chambers, each of which is connected with one of said connections and through separate connecting channels with two adjacent chambers, and further comprising closing means arranged in the chambers and operationally coupled to each other in order to selectively connect each connection with one other connection through said connecting channels and chambers.

In various industrial treatment processes, as in dairies, in the food industry and in soft drink factories, two liquid feeding lines often have to be alternately connected to a container in order to prevent the liquids from getting mixed up with each other. For instance, in dairies milk cisterns must be washed from time to time whereby it must be secured that wash liquid is lead into the cistern to be washed only after the product line has been reliably separated from the wash line. In order to prevent wash liquid from getting into the product line, necessary stop valves are, of course, used but in spite of this there is a risk that wash liquid may get past such a stop valve into the product line, either because the valve is untight or the valve has not been closed by oversight.

In order to avoid said risk, a 4-way valve has been developed earlier comprising a fixed plate and a plate rotationally pivoted thereto, both plates having each four openings opposite each other. To the openings of the fixed plate are connected four connections - two connections for each feeding line - and the openings of the pivoted plate are connected in pairs by means of a 180° tube bend. Pneumatically driven means lift the pivoted plate and turn it around 90° before the pivoted plate is again lowered upon the fixed plate. Thus, the pairs of openings which are connected to each other in both plates change each time the pivoted plate turns.

Both feeding lines can indeed be kept apart with such a valve during the various operations with two separate paths of flow, but also in this apparatus there is a risk that, if one of the packings involved operates unsatisfactorily or fails, liquid may leak between the plates from one line to the other, since the pivoted plate including the tube bend forms one unit. The lifting, turning and lowering of the pivoted plate also requires a fairly complicated operating mechanism.

It is the object of this invention to provide a 4-way valve making it possible to use rotary slides, which are known per se and are simple in construction, for the separation of two feeding lines from each other and still being more reliable in regard to leaks than ordinary 4-way valve constructions. This object is achieved by means of the valve according to the invention, wherein the closing means formed as rotary slides are operationally coupled to each other so that the slides in each operation position close two connecting channels from two sides and open the two other connecting channels.

According to the invention, the valve connecting channels to be closed in each particular case can be closed at two ends, i.e. from the side of both chambers connected with said connecting channel, thus securing a double sealing of the connecting channel. The adjustment of the valve takes place by means of the rotary motion of the slides, and the slides can be simply coupled together operationally so that the valve operates as one unit driven e.g. by a double-acting pressure fluid cylinder.

Figure 3:
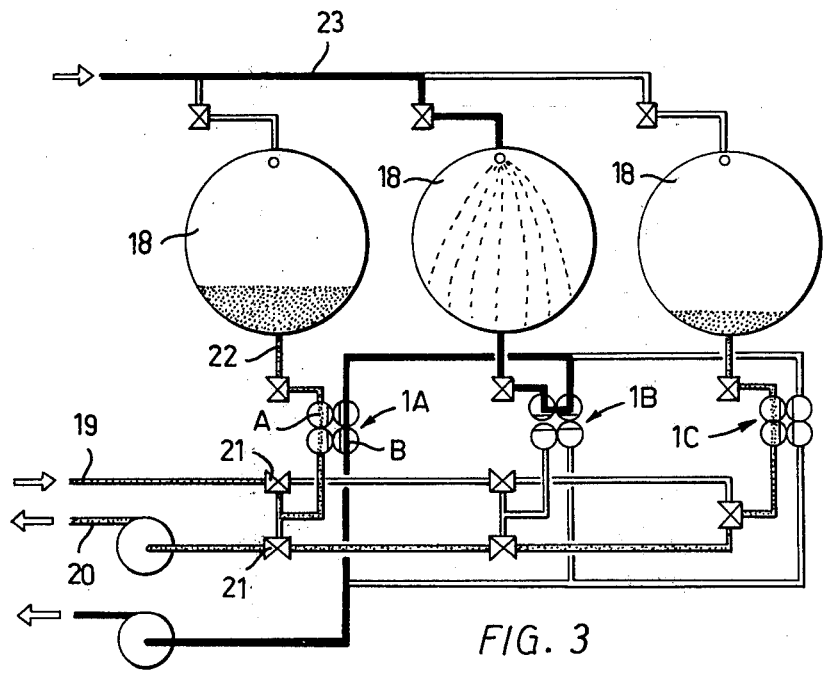
Figure 4:
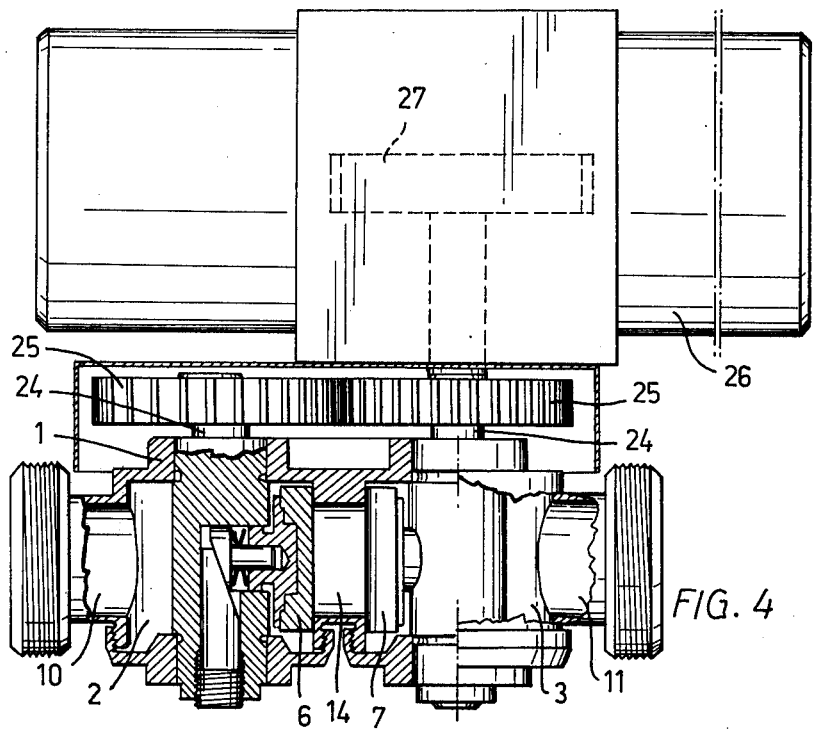
Figure 5:
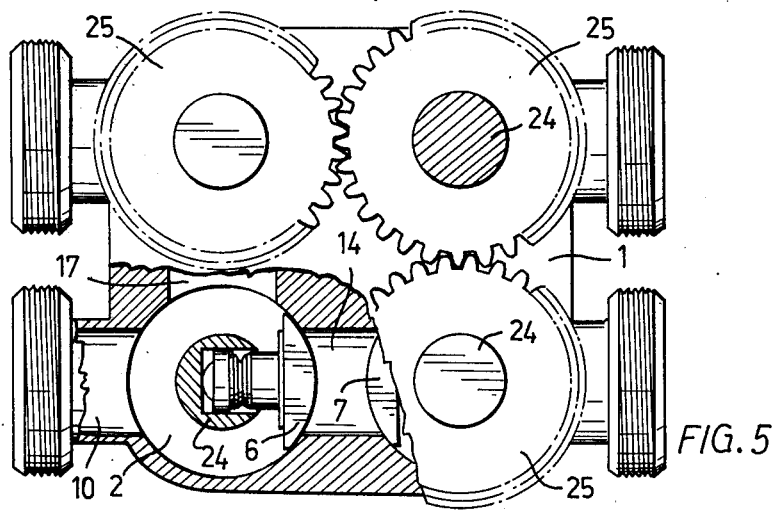

The invention will be described in more detail in the following with reference to the accompanying drawings, wherein FIGS. 1 and 2 show in schematic cross-section the structural and functional principle of a valve according to the invention in two different operating positions of the slides, FIG. 3 is a schematic view of a system including 4-way valves according to the invention, FIG. 4 is a more detailed partial axial section of one preferred embodiment of the valve, and FIG. 5 is a top view of the valve in partial section.

The valve shown in the drawing comprises a housing 1 provided with four axially parallel chambers 2, 3, 4 and 5 located at the corners of a square. In each chamber is rotationally mounted a rotary slide 6, 7, 8 and 9 respectively and to each chamber is connected an inlet/outlet connection 10, 11, 12 and 13 respectively. Each chamber is, moreover, connected to two adjoining chambers by means of connecting channels 14, 15, 16 and 17 respectively.

As appears from FIGS. 1 and 2, the rotary slides are mutually arranged so that the slides are always positioned in parallel with each other, and the slides are operationally coupled together by means of a gear wheel in a manner to be described later. The valve thus forms in the positions shown in both FIGURES two separate paths of flow, e.g. a product line A and a wash line B. It will be noted that in both cases the connecting channels between the product lines, e.g. channels 15 and 17 in FIG. 1, are at their both ends closed by the slides, in this case by the slides 6 and 9 resp. 7 and 8 so that a double sealing of the connecting channels is achieved.

FIG. 3 illustrates the operation of the 4-way valve when applied to a milk storage system known per se. In this FIGURE reference numeral 18 identifies a milk storage cistern. Reference numeral 19 indicates a milk supply pipe system and 20 a milk drain pipe system which are connected through stop valves 21, with 4-way valves 1A, 1B and 1C, and further with a pipe system 22 leading to the corresponding cistern. In the case shown in FIG. 3, the left-hand cistern is being filled, the middle cistern is being washed, and the right-hand cistern is being emptied. Milk is supplied under pressure to the cistern along the left-hand product line A through valve 1A, while wash liquid is drained under suction from the cistern along the right-hand wash line B. The fact that both pressure and suction appear simultaneously in the valve requires a very reliably tightness of the valve. It will be noted that the same pressure/suction effect appears also in the other valves during the corresponding functions. The necessary tightness has in the valve according to the invention been obtained by means of the double sealing of the connecting channels. Since the slides are formed by separate elements and therefore are independent of each other as far as the tightness is concerned, the eventual failure of the tightness of one slide thus does not yet cause the mixing up of different liquids.

The separate chambers and rotary slides of the valve according to the invention are shown in FIGS. 4 and 5 and are of the construction described in Finnish Pat. No. 36,080 and corresponding U.S. Pat. No. 3,342,453. Therefore their details will not be explained more closely. The spindle 24 of each slide is fixed to a gear wheel 25 located outside the housing. All gear wheels are in mutual engagement in pairs, as appears from FIG. 5. To the housing is, moreover, fixed a double-acting adjusting cylinder 26 known per se, the rack of which is in engagement with a gear wheel 27 fixed to the elongation of the spindle of one slide. Thus, all slides can be turned simultaneously in their chambers over an angle of the same size to their operating positions.

The drawing and description attached thereto are only intended to illustrate the idea of the invention. As to its details, the valve according to the invention may vary even considerably within the scope of the claims.

What I claim is:

1. A four-way valve for selectively connecting two liquid supply lines separately to a container for conducting a liquid into and out from said container, comprising a valve housing which defines:

four valve chambers;

four internal connection passages whereby each of said valve chambers is connected to two others of said valve chambers, each valve chamber being connected by said internal passages to only two others of said valve chambers; and four external connection passages communicating with said four valve chambers respectively and providing two inlets to the valve and two outlets therefrom, and the valve further comprising four rotary slide members fitted in the valve chambers respectively and cooperating with the valve housing so that each slide member is capable of closing off selectively either of the internal connection passages connected to the valve chamber in which it is fitted while leaving open both the other such internal connection passage and the external connection passage communicating with the valve chamber, said four rotary slide members being operatively coupled to each other so that in a first operational position of the rotary slide members a first internal connection passage is closed at both ends by first and second slide members respectively, a second internal connection passage is closed at both ends by third and fourth slide members respectively, a third internal connection passage is open and connects first and second of the external connection passages together, and the fourth internal connection passage is open and connects the third and fourth external connection passages together, whereas in a second operational position of the slide members the third internal connection passage is closed at both ends by the first and third slide members respectively, the fourth internal connection passage is closed at both ends by the second and fourth slide members respectively, the first internal connection passages is open and connects the first and third external connection passages together, and the second internal connection passage is open and connects the second and fourth external connection passages together.

2. A valve as claimed in claim 1, wherein each rotary slide member is provided with a radially elastic slide having the shape of a circular segment.

3. A valve as claimed in claim 1, wherein the rotary slide members are connected together by toothed gearing whereby the slide members are constrained to rotate in synchronism in their respective valve chambers.

4. A valve as claimed in claim 3, wherein the valve chambers are cylindrical and their central axes lie parallel to one another in a square array, and the slide members are connected to respective toothed gear wheels, each of said gear wheels being in meshing engagement with two others of said gear wheels.

* * * * *